US008646928B2

United States Patent
Liang et al.

(10) Patent No.: US 8,646,928 B2
(45) Date of Patent: Feb. 11, 2014

(54) BACKLIGHT MODULE AND LIQUID CRYSTAL DISPLAY APPARATUS

(75) Inventors: Chung-Cheng Liang, Taoyuan (TW); Wei-An Hua, Taoyuan (TW)

(73) Assignee: Global Lighting Technologies, Inc., Taoyuan (TW)

( * ) Notice: Subject to any disclaimer, the term of this patent is extended or adjusted under 35 U.S.C. 154(b) by 189 days.

(21) Appl. No.: 13/340,094

(22) Filed: Dec. 29, 2011

(65) Prior Publication Data

US 2012/0170252 A1  Jul. 5, 2012

(30) Foreign Application Priority Data

Dec. 31, 2010 (TW) ................. 99147356 A
Jan. 31, 2011 (TW) ................. 100103842 A

(51) Int. Cl.
G09F 13/04 (2006.01)
(52) U.S. Cl.
USPC ......... 362/97.1; 362/97.3; 362/616; 362/612; 362/613
(58) Field of Classification Search
USPC .............. 362/97.1, 97.3, 616, 612, 613
See application file for complete search history.

(56) References Cited

U.S. PATENT DOCUMENTS

| 7,632,002 | B1 * | 12/2009 | Park et al. | 362/616 |
|---|---|---|---|---|
| 7,980,747 | B2 * | 7/2011 | Vissenberg et al. | 362/612 |
| 8,388,212 | B2 * | 3/2013 | Baek et al. | 362/634 |
| 8,408,776 | B2 * | 4/2013 | Liu | 362/616 |
| 2011/0157917 | A1 * | 6/2011 | Chang et al. | 362/613 |
| 2011/0221785 | A1 * | 9/2011 | Joung et al. | 345/690 |

* cited by examiner

Primary Examiner — Evan Dzierzynski
(74) Attorney, Agent, or Firm — Chun-Ming Shih; HDLS IPR Services

(57) ABSTRACT

The present invention provides a backlight module including a plurality of illuminant units and two light guide plates respectively arranged at two opposite sides of the illuminant units. Each of the light guide plates has a light-incident surface and a light-emitting surface adjacent to the light-incident surface. A portion of the illuminant units emit light toward the light-incident surface of one of the light guide plates, and the other portion of the illuminant units emit light toward the light-incident surface of the other light guide plate. The dimension of the light-emitting surface of each light guide plate is positive proportional to the amount of the illuminant units emitting light toward the light guide plate. In addition, the present invention also provides a liquid crystal displaying apparatus including the above-mentioned backlight module.

14 Claims, 12 Drawing Sheets

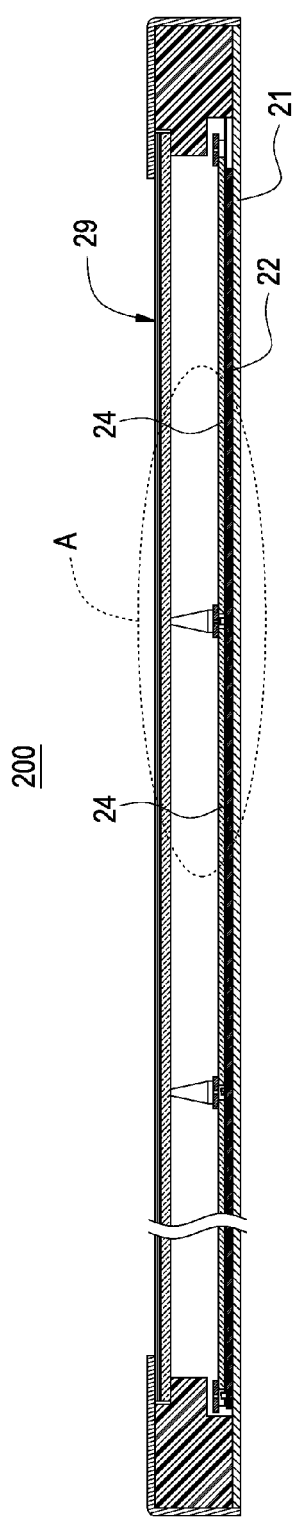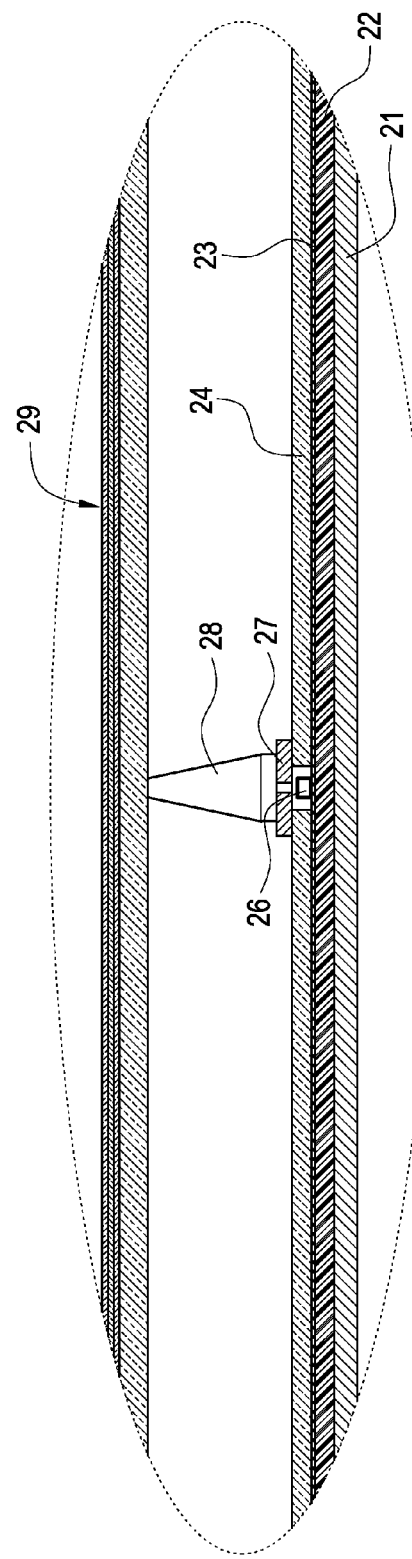
FIG.2
FIG.3

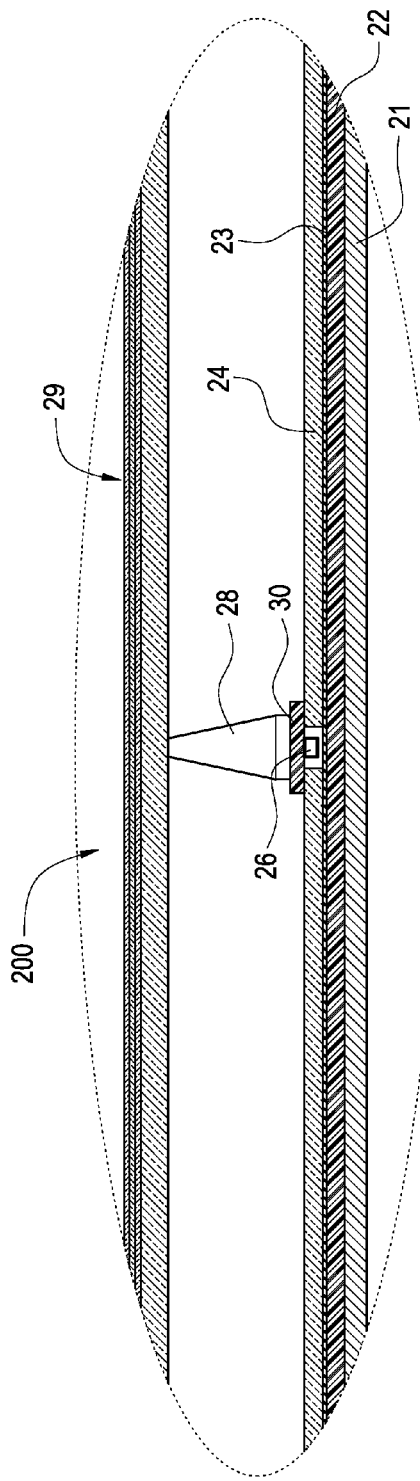
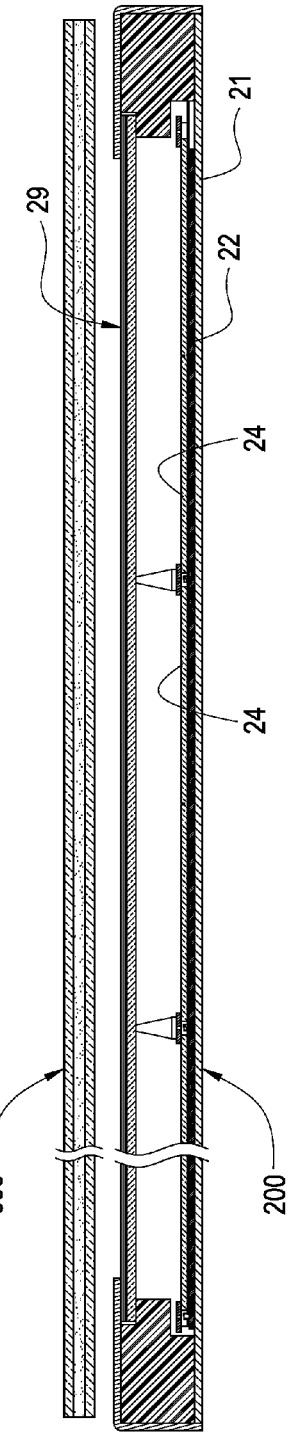

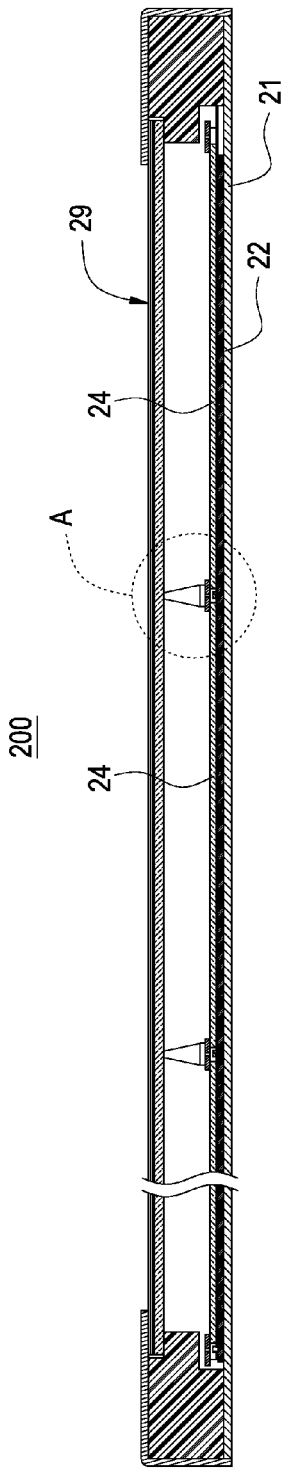
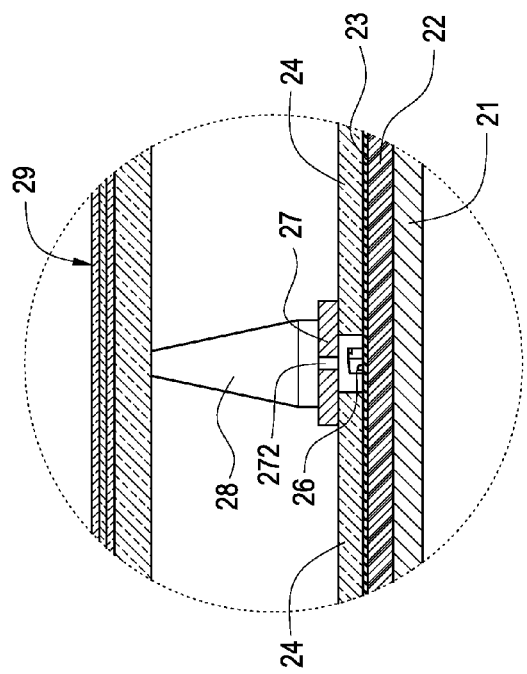
FIG.12
FIG.13

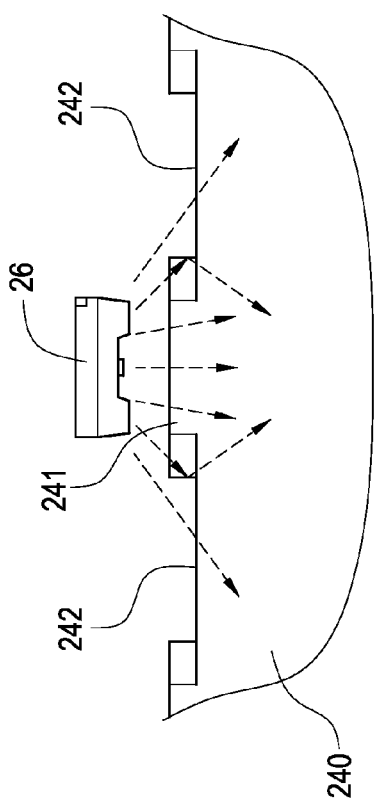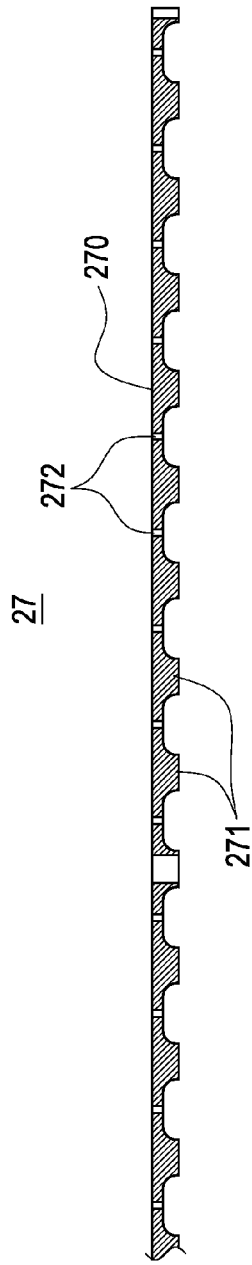

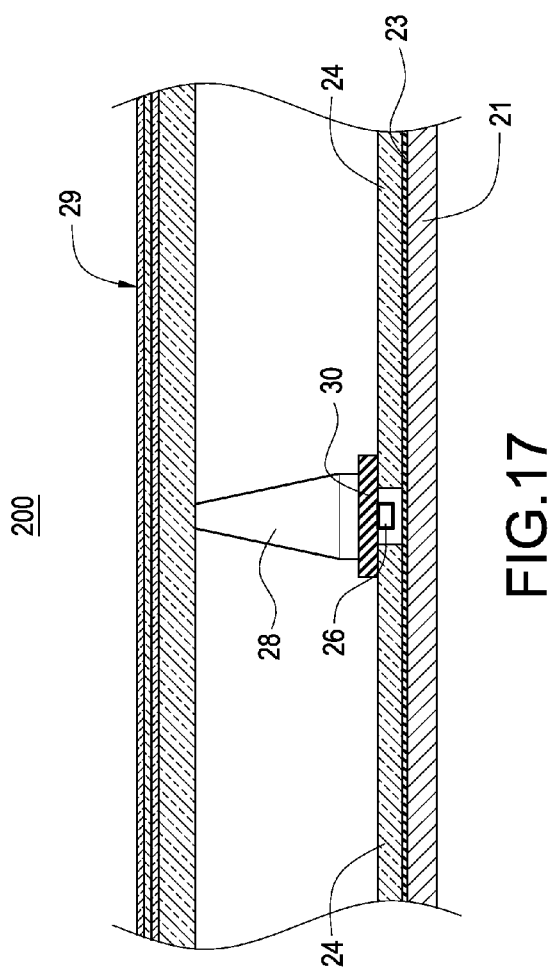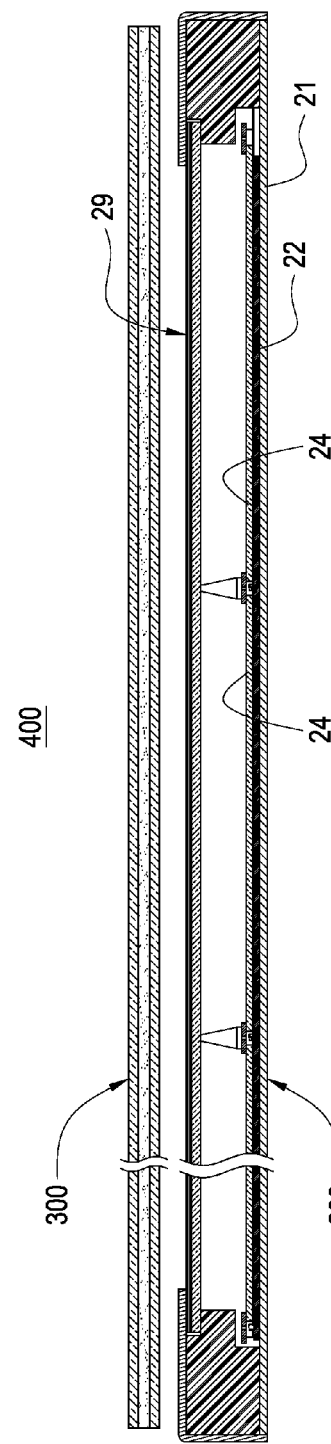

BACKLIGHT MODULE AND LIQUID CRYSTAL DISPLAY APPARATUS

BACKGROUND OF THE INVENTION

1. Field of the Invention

The present invention relates to a planar light source, and in particular to a backlight module used in a liquid crystal displaying apparatus.

2. Description of Prior Art

Backlight module converts light generated by linear light source or point light source into uniform planar light source through light guide plate and is applied to liquid crystal displaying apparatus. Compared to the early backlight module using cold cathode fluorescent lamps, light emitting diodes (LEDs) have a characteristic of energy-saving and can provide sufficient brightness. Therefore, backlight module using LED as a light source is gradually increased.

Reference is made to FIG. 1, which is a schematic view of a conventional backlight module. The backlight module 100 includes at least two light guide plate 11 spliced from each other and a plurality of light emitting diodes (LEDs) 12 arranged at laterals of the light guide plates 11. The LEDs 12 emit light to the light guide plates 11, respectively. Light entering to the light guide plate 11 is diffused upwardly and mixing in a mixing space 14 and emits through a diffusing plate 13. Each light guide plate 11 can be defined as an independent lighting area, thereby individually controlling lighting time of each light guide plate 11 can achieve request of local dimming, and has advantages of increasing picture quality and lower consumption when applying to liquid crystal displaying apparatuses.

However, the LEDs 12 mentioned above emit light toward the light guide plate 11 in a single direction. Light is leaked by long distance transmission, and the light-emitting efficiency of an end of the light guide plate 11 far away from the LEDs 12 is lower than the light-emitting efficiency of an end of the light guide plate 11 close to the LEDs 12. Therefore, the illumination uniformity of the backlight module is not good, and the performance of picture quality is seriously affected when applied in liquid crystal displaying apparatus.

In addition, the existence of the light-mixing area 14 makes the diffusing plate 13 cannot further close to the light guide plate 11, resulting in increased thickness of the backlight module, and liquid crystal displaying apparatus cannot become thinner. Furthermore, the maximum illumination of the LEDs 12 is increased constantly, and the amount of the LEDs 12 can effectively reduce in the same dimension of backlight module by using high power LEDs, therefore the manufacturing cost can be decreased and easily manufacturing process. However, when the LEDs 12 are high power LEDs shown in the FIG. 1, a higher light-emitting efficiency is generated at a gap 15 between the LEDs 12 and portions of the light guide plate 11 adjacent to the LEDs 12. Therefore, the illumination of the diffusing plate 13 above the LEDs 12 is higher than other portions and cannot achieve the request of uniform illumination.

SUMMARY OF THE INVENTION

It is an object of the present invention to provide a backlight module to solve problems mentioned above, the backlight module not only achieves the request of uniform illumination and can effectively reduce thickness of the backlight module.

Accordingly, the backlight module according to one aspect of the present invention comprises a plurality of illuminant units and two light guide plates respectively arranged at two opposite sides of the illuminant units. Each of the light guide plates has a light-incident surface and a light-emitting surface adjoined to the light-incident surface. A portion of the illuminant units emit light toward the light-incident surface of one of the light guide plates, and the other portion of the illuminant units emit light toward the light-incident surface of the other light guide plate. The dimension of the light-emitting surface of each light guide plate is positive proportional to the amount of the illuminant units which emit light toward the light guide plate.

According to a preferred embodiment of the invention, wherein the two portions of the illuminant units emitting light toward the light guide plates are arranged in interlaced manner.

According to a preferred embodiment of the invention, the backlight module further comprises a circuit board arranged below the light guide plates and the illuminant units.

According to a preferred embodiment of the invention, the backlight module further comprises a pressing strip arranged above the illuminant units.

According to a preferred embodiment of the invention, wherein the pressing strip has a stopping part extended downwardly therefrom, the illuminant units are staggered by the stopping part staggers and two sides of the stopping part are contacted to the light guide plates, respectively.

According to a preferred embodiment of the invention, wherein the pressing strip further comprises at least a through-hole arranged above one of the illuminant units.

According to a preferred embodiment of the invention, wherein the pressing strip is made of transparent material or translucent material.

According to a preferred embodiment of the invention, the backlight module further comprises a circuit board of strip shape and arranged above the illuminant units, the illuminant units are electrically connected to the circuit board.

According to a preferred embodiment of the invention, wherein the circuit board has at least a stopping part extended downwardly therefrom, the illuminant units are staggered by the stopping part and two sides of the stopping part are contacted to the light guide plates, respectively.

According to a preferred embodiment of the invention, wherein the light guide plate has at least a protruding part protruded from a main body of the light guide plate.

According to a preferred embodiment of the invention, wherein a length of the protruding part protruded from a direction perpendicular to the main body is between 0.3 and 1 mm.

Accordingly, the backlight module according to another aspect of the present invention comprises a plurality of illuminant units and a light guide plate. The light guide plate has two light guide units respectively arranged at two opposite sides of the illuminant units and a connecting unit connected the light guide units. Each light guide unit has a light-incident plate adjacent to the illuminant units and a light-emitting surface adjoined to the light-incident surface. A portion of the illuminant units emit light toward the light-incident surface of one of the light guide units, and the other portion of the illuminant units emit light toward the light-emitting surface of the other light guide unit. The dimension of the light-emitting surface of each light guide unit is positive proportional to the amount of the illuminant units which emit light toward the light guide unit.

According to a preferred embodiment of the invention, wherein the two portions of the illuminant units emitting light toward the light guide units are arranged in interlaced manner.

According to a preferred embodiment of the invention, wherein the connecting unit is arranged above the illuminant units, the backlight module further comprises a circuit board arranged below the light guide units and the illuminant units, and the illuminant units are electrically connected to the circuit board.

According to a preferred embodiment of the invention, wherein the connecting unit has at least a through-via arranged above the one of the illuminant units.

According to a preferred embodiment of the invention, wherein the connecting unit is arranged below the illuminant units, the backlight module further comprises a circuit board of strip shape and arranged above the illuminant units, and the illuminant units are electrically connected to the circuit board.

According to a preferred embodiment of the invention, wherein the circuit board has at least a stopping part extended downwardly therefrom, the illuminant units are staggered by the stopping part and two sides of the stopping part are contacted to the light guide units, respectively.

According to a preferred embodiment of the invention, wherein the light guide plate has at least a protruding part protruded from a main body of the light guide plate.

According to a preferred embodiment of the invention, wherein a length of the protruding part protruded from a direction perpendicular to the main body is between 0.3 and 1 mm.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

FIG. 2 is a cross-sectional view of a backlight module according to a preferred embodiment of the present invention;

FIG. 3 is a partially cross-sectional view of the backlight module;

FIG. 10 is a cross-sectional view of a backlight module according to another preferred embodiment of the present invention;

FIG. 11 is a schematic view of a liquid crystal displaying apparatus according to the present invention;

FIG. 12 is a cross-sectional view of a backlight module according to still another preferred embodiment of the present invention;

FIG. 13 is a partially cross-sectional view of the backlight module;

FIG. 15 is a partially top view of the backlight module;

FIG. 16 is a cross-sectional view of a press strip of the backlight module;

FIG. 17 is a cross-sectional view of a backlight module of yet another preferred embodiment of the present invention; and FIG. 18 is a schematic view of a liquid crystal displaying apparatus according to the present invention.

DETAILED DESCRIPTION OF THE INVENTION

Figure 1:
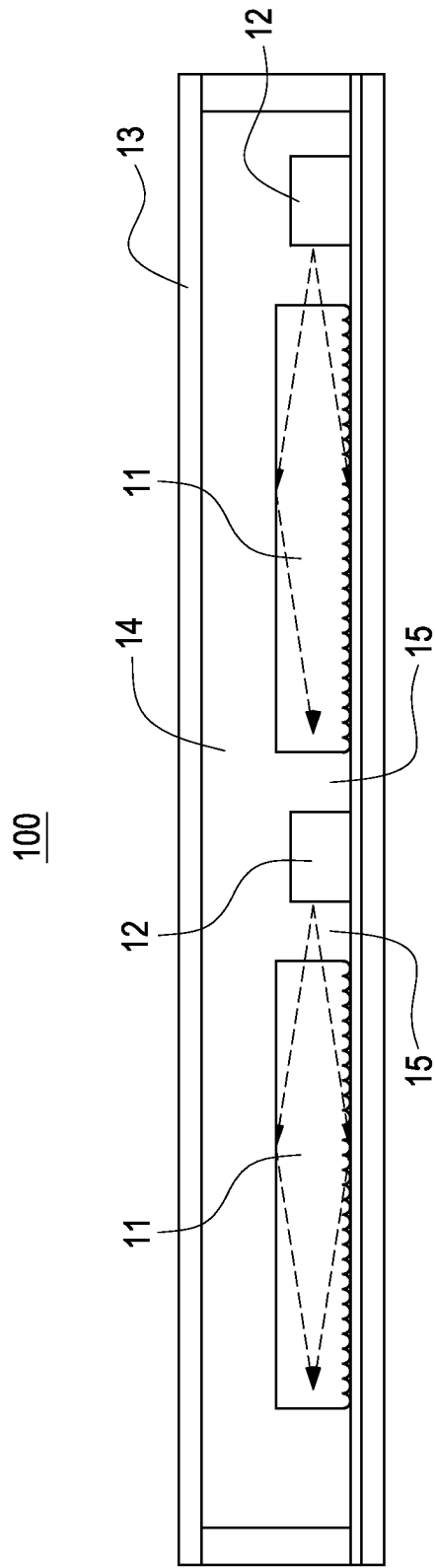
FIG. 1 is a schematic view of a conventional backlight module.

A preferred embodiment of the present invention will be described with reference to the drawings.

Reference is made to FIG. 2 and FIG. 3, which are respectively a cross-sectional view and a partially cross-sectional view of a backlight module according to a preferred embodiment of the present invention. The backlight module 200 includes a metallic chassis 21, a base plate 22 arranged on the chassis 21, a reflecting plate 23 (as shown in FIG. 3) arranged on the base plate 22, a plurality of light guide plates 24 arranged on the reflecting plate 23, a plurality of illuminant units 26 arranged between the light guide plates 24, a pressing strip 27 across the light guide plates 24 and covering the illuminant units 26, a plurality of supporting pillars 28 arranged on the pressing strip 27 and a plurality of optical films 29 supported on the light guide plates 24 through the supporting pillars 28. The optical films 29 may, but not limited to, include diffusing plate, brightness enhancement plate.

Figure 4:
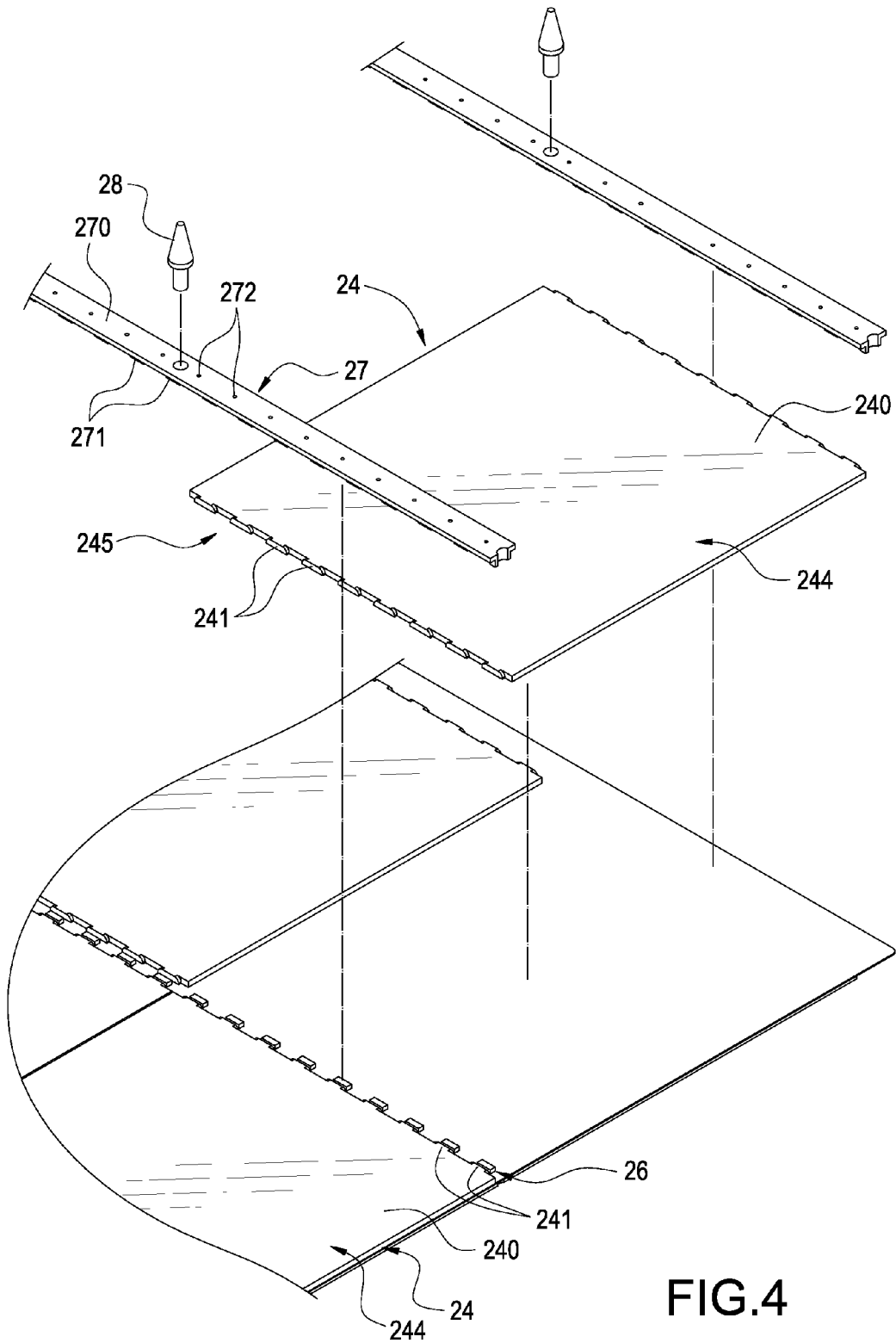
FIG. 4 is an explode perspective view of the backlight module.
Figure 5:
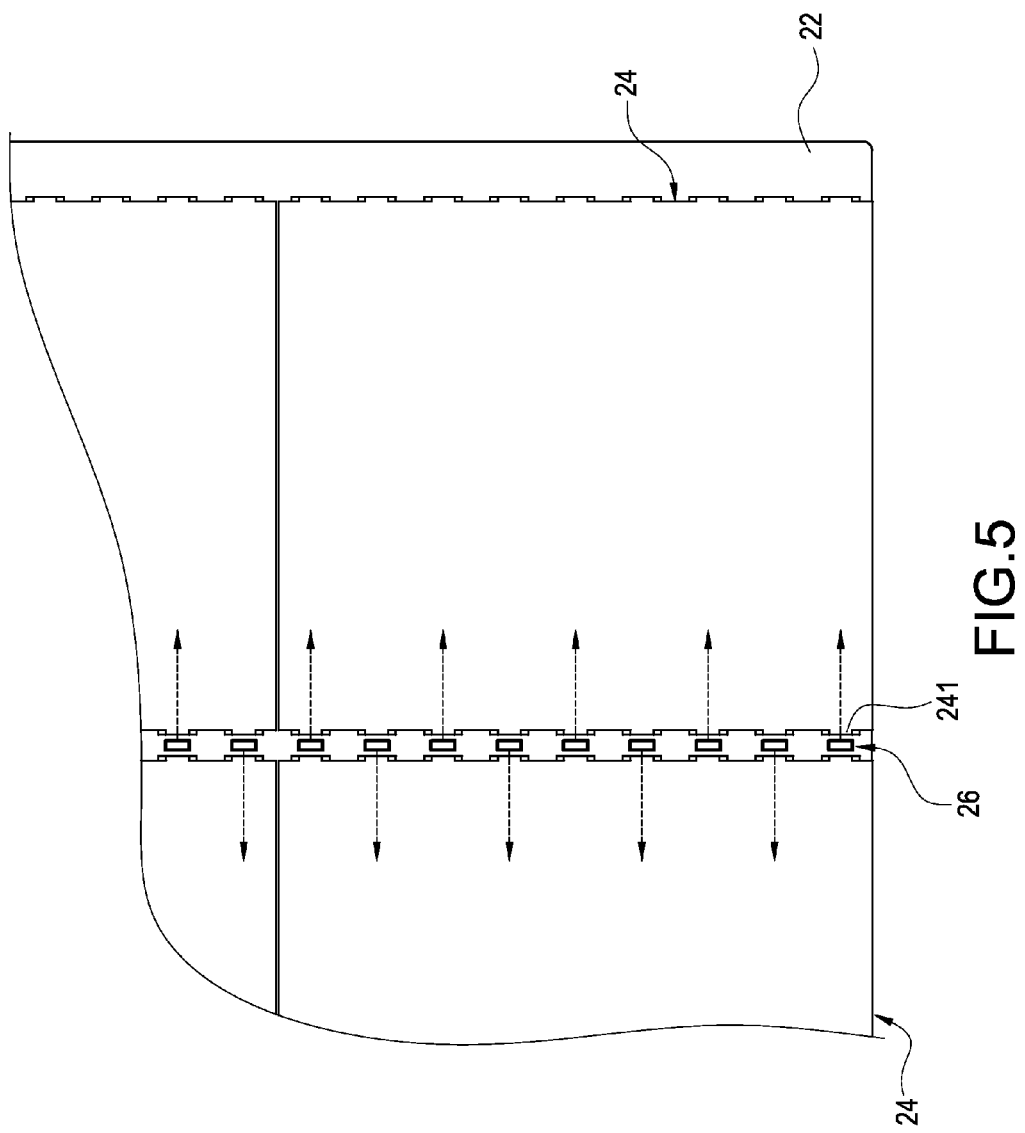
FIG. 5 is a top view of the backlight module.

With Reference to FIG. 4 and FIG. 5, the base plate 22 is a circuit board and electrically connected to the illuminant units 26. The illuminant units 26 are, but not limited to, side-view light emitting diodes (LEDs). The illuminant units 26 are arranged along straight line and formed multiple illuminant unit rows. The illuminant units 26 of each illuminant unit row are arranged in straight manner. The light guide plates 24 are respectively arranged at two opposite sides of the illuminant unit row, as shown in the left side of FIG. 5. Each of the light guide plates 24 has a light-emitting surface 244 and a light-incident surface 245 adjoined to the light-emitting surface 244. Therefore the illuminant units 26 can laterally emit light into the light guide plates 24 through the light-incident surfaces 245.

A portion of illuminant units 26 emit light toward the light-incident surface 245 of one of the light guide plates 24, and the other portion of the illuminant units 26 emit light toward the light-incident surface 245 of the other light guide plate 24, as shown in the left side of FIG. 5. The two portions of the illuminant unit 26 are arranged in interlaced manner, as shown in FIG. 5, to disperse light-emitting efficiency of light and prevent bright spot formed by locally light convergency. In order to provide uniform luminous intensity of each light guide plate 24, the amount of the illuminant units is preferably adjusted according to the dimension of the light-emitting surface 244 of each light guide plate 24. For example, when dimensions of one light guide plate 24 is large, and the other is small, therefore five illuminant units 26 (LEDs, for example) emit light toward the larger light guide plate 24 and four illuminant units 26 (LEDs, for example) emit light toward the smaller light guide plate 24, Such that luminous intensity of two light guide plates 24 are uniform and light emit by the illuminant units 26 cannot leak by long distance transmission. In more particularly, the illuminant units may be arranged in interlaced manner in the same illuminant unit row, or in the different illuminant unit rows.

Figure 6:
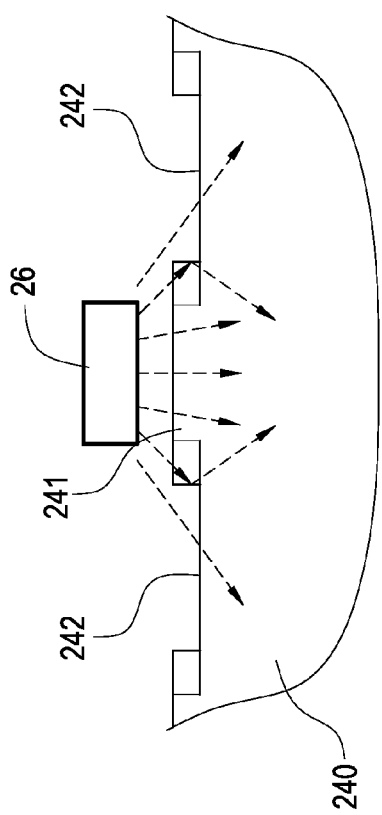
FIG. 6 is a partially top view of the backlight module.

With reference again to FIG. 4 and FIG. 5, in order to increase the ratio of light emitting by the illuminant units 26 enter to the light guide plate 24 and reduce light leakage and prevent bright line or bright spot, the light guide plate 24 includes a main body 240 and a plurality of protruding parts 241 laterally protruded from the main body 240 and toward the illuminant units 26. The protruding parts 241 guide light emitting by the illuminant unit 26 to the main body 240. Reference is made to FIG. 6, the illuminant units 26 are respectively arranged at the protruding parts 241 and provided as a buffer area of light for receiving light emitted by the illuminant units 26 and diffusing light with higher light-emitting efficiency, thereby optical densities of light indirectly entering to the main body 240 through the protruding parts 241 and light obliquely directly emitted to the main body 240 through the illuminant units 26 are substantially the same, and any position of the main body 240 can receive uniform illumination.

Figure 7:
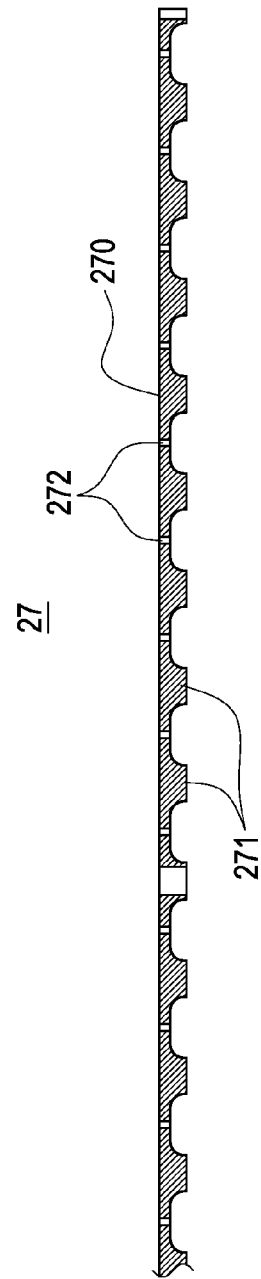
FIG. 7 is a cross-sectional view of a pressing stripe of the backlight module.

With reference again to FIG. 4, the pressing strip 27 is across the main bodies 240 of light guide plates 24 and covers the protruding parts 241 arranged at two sides of the illuminant units 26. The pressing strip 27 not only fastens the light guide plates 24 and the illuminant units 26, but prevents light from upwardly leaking by the protruding parts 241. With reference to FIG. 4 and FIG. 7, the pressing strip 27 includes a strip main body 270 and a plurality of stopping parts 271 extended downwardly from the strip main body 270, and the illuminant units 26 are staggered by the stopping unit 27. Two sides of the stopping part 271 are respectively contacted to the main bodies 240 of the light guide plates 24 to fasten the relative position of the light guide plates 24. The stopping part 271 prevents interference of light emitted by adjacent illuminant units 26, in more particularly to that the adjacent illuminant units 26 with different colors and lighted at different times, therefore to increase picture quality. In addition, the pressing strip 27 has a plurality of through-vias 272 respectively arranged above the illuminant units 26 staggered by the stopping parts 271. By controlling dimensions and disposed density of the through-holes 272, the light received by the optical films 29 can be optimal. Furthermore, in other to achieve preferable uniformity of light, the pressing strip 27 can be made by translucent material.

Figure 8:
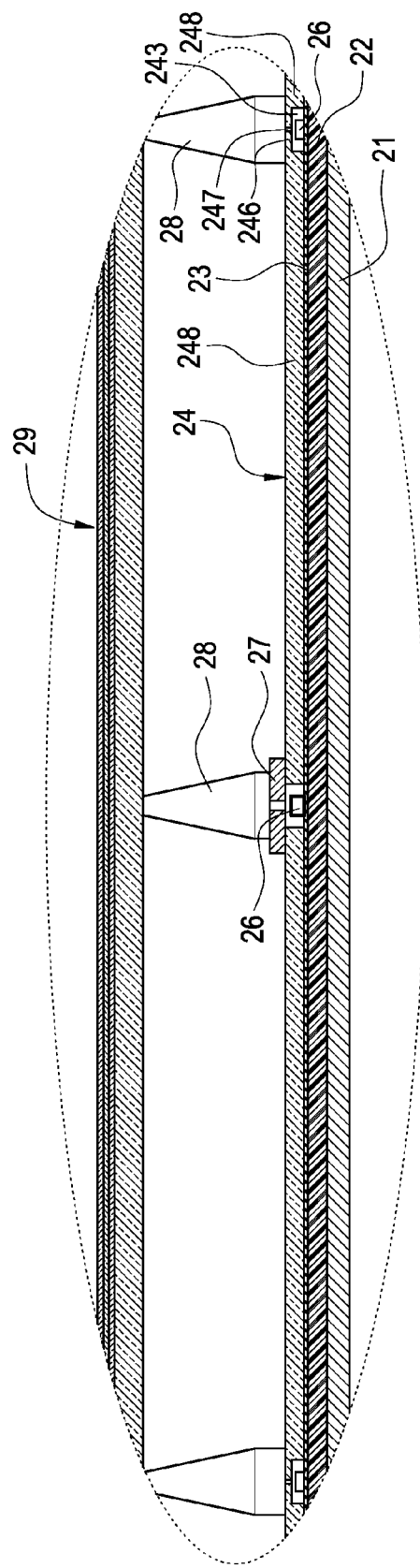
FIG. 8 is a partially cross-sectional view of the backlight module.

Reference is made to FIG. 8, a lower surface of each of the light guide plates 24 has a plurality of isolated recess 243 substantially parallel to the arranging direction of the illuminant units 26. And the backlight module 200 includes a plurality of illuminant units 26 arranged within the isolated recess 243. Each isolated recess 243 separates each light guide plate 24 into two opposite light guide units 248 arranged at two sides of the illuminant units 26, and a connecting unit 246 is arranged between the light guide units 248 and connected the light guide units 248. Each light guide unit 248 has a light-incident surface (lateral surface of the isolated recess 243) adjacent the illuminant units 26 and a light-emitting surface (a portion of the light-emitting surface 244 of the light guide plate 24) adjoined to the light-incident surface. A portion of illuminant units 26 emit light toward the light-incident surface of one of the light guide units 248, and the other portion of the illuminant units 26 emit light toward the light-incident surface of the other light guide unit 248.

Figure 9:
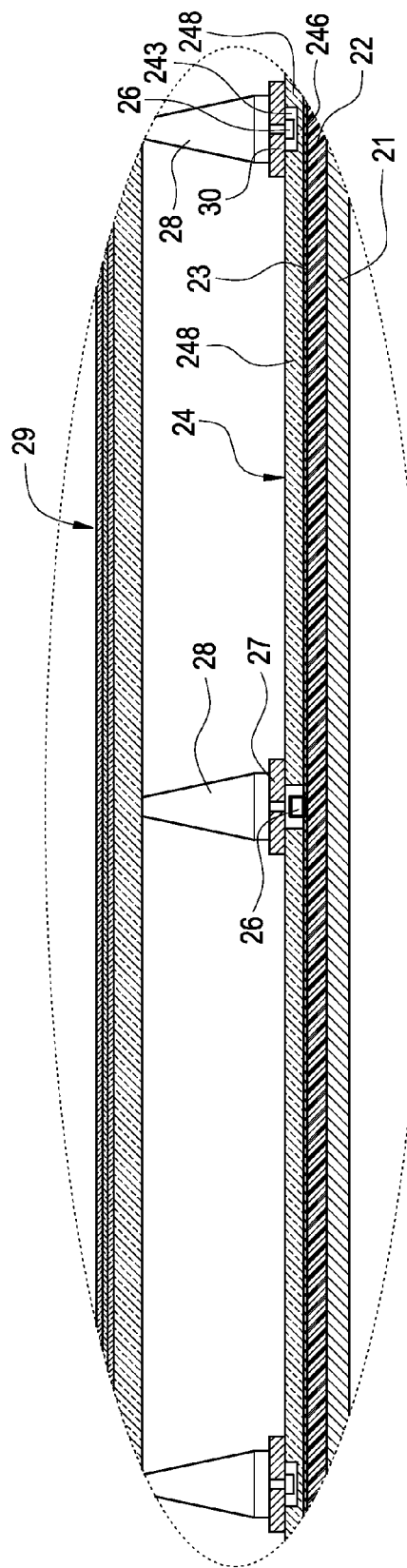
FIG. 9 is a partially cross-sectional view of the backlight module.

In addition, the dimension of the light-emitting surface of each light guide unit is substantially positive proportional to the amount of the illuminant units 26 emitting light toward the light guide unit 248. With reference again to FIG. 8, the connecting unit 246 is arranged above the illuminant units 26. The backlight module 200 further includes a circuit board 22 arranged below the light guide units 248 and the illuminant units 26, and the illuminant units 26 are electrically connected thereto. Furthermore, at least a through-via 247 is formed on the connecting unit 246 and arranged above one of the illuminant units 26. Alternatively, the connecting unit 246 may be arranged below the illuminant units 26, as shown in FIG. 9, and the backlight module further includes a circuit board 30 of strip shape and arranged above the illuminant units 26, and the illuminant units 26 are electrically connected thereto. A supporting pillar 28 is arranged above the connecting unit 246 or the circuit board 30 for supporting the optical films 29, as shown in FIG. 8 or FIG. 9.

Reference is made to FIG. 10, which is a cross-sectional view of a backlight module according to another embodiment of the present invention. The backlight module 200 is similar to that of embodiment mentioned above, but the different is that the pressing strip is a circuit board 30. The circuit board 30 not only covers the illuminant units 26 and other adjacent area, but also arranged above the illuminant units 26 and the illuminant units 26 electrically connected thereto.

Reference is made to FIG. 11, which is a cross-sectional view of a liquid crystal displaying apparatus. The liquid crystal displaying apparatus 400 includes a backlight module 200 mentioned above and a liquid crystal panel 300 arranged above the backlight module 200. The backlight module 200 is used for providing a uniform planar light source to the liquid crystal panel 300.

To sum up, illuminant units 26 are arranged between two light guide plates 24 and emit light toward the light guide plates 24, and the dimensions of the light-emitting surface of each light guide plate 24 is positive proportional to the amount of the illuminant units 26 emitting light toward the light guide plate 24, such that the light leakage by long distance transmission is largely decreased and each lighting area can achieve uniform illumination.

In addition, light is first diffused by the protruding parts 241 laterally extended form the main body 240 and then entering to the main body 240, such that the main body 240 receives uniform illumination. The pressing strip 27 (or the circuit board 30) arranged above the illuminant units 26 fastens the illuminant units 26 and the light guide plates 24, and when the pressing strip 27 is made of opaque material, which has a function of covering light above the illuminant units 26 which causes bright spot or bright line. Therefore, even though the illuminant units 26 are high power illuminant units, the illumination of the area of the optical films 29 above the illuminant units 26 cannot higher than other area and achieve request of uniformity illumination. Furthermore, the light mixing space is largely decreased according to bright spot or bright line cannot appear on the optical films 29, and the distance disposed between the optical films 29 and the light guide plates 24 can decrease and then the thickness of the backlight module 200 can effectively decrease.

Reference is made to FIG. 12 and FIG. 13, which are respectively a cross-sectional view and a partially cross-sectional view of a backlight module according to another preferred embodiment of the present invention. The backlight module 200 includes a metallic chassis 21, a circuit board 22 arrange on the chassis 21, a reflecting plate 23 arranged on the circuit board 22 (as shown in FIG. 13), a light guide assemble including a plurality of light guide plates 24 and arranged on the reflecting plate 23, a plurality of illuminant units 26 arranged between the light guide plates 24, a pressing strip 27 across the light guide plates 24 and covering the illuminant units 26, a plurality of supporting pillars 28 arranged on the pressing strip 27 and a plurality of optical films 29 supported on the light guide plates 24 through the supporting pillars 28. The optical films 29 may, but limited to, include diffusing plate, brightness enhancement plate.

The circuit board 22 is electrically connected to the illuminant units 26, as shown in FIG. 13. The light guide plates 24 are respectively arranged at the opposite sides of the illuminant units 26, and the illuminant units 26 laterally emit light toward the light guide plates 24. In this embodiment, the illuminant units 26 are, but not limited to, light emitting diodes (LEDs). The reflecting plate 23 is used for reflecting light penetrated from the light guide plates 24 and entering the light into the light guide plates 24 again to increase usage of light. The pressing strip 27 arranged on the illuminant units 26 is used for fastening the illuminant units 26 between two light guide plates 24. The pressing strip 27 may be made of transparent material or opaque material to prevent light directly projecting upwardly to the optical films 29 and cause bright spot or bright line.

Figure 14:
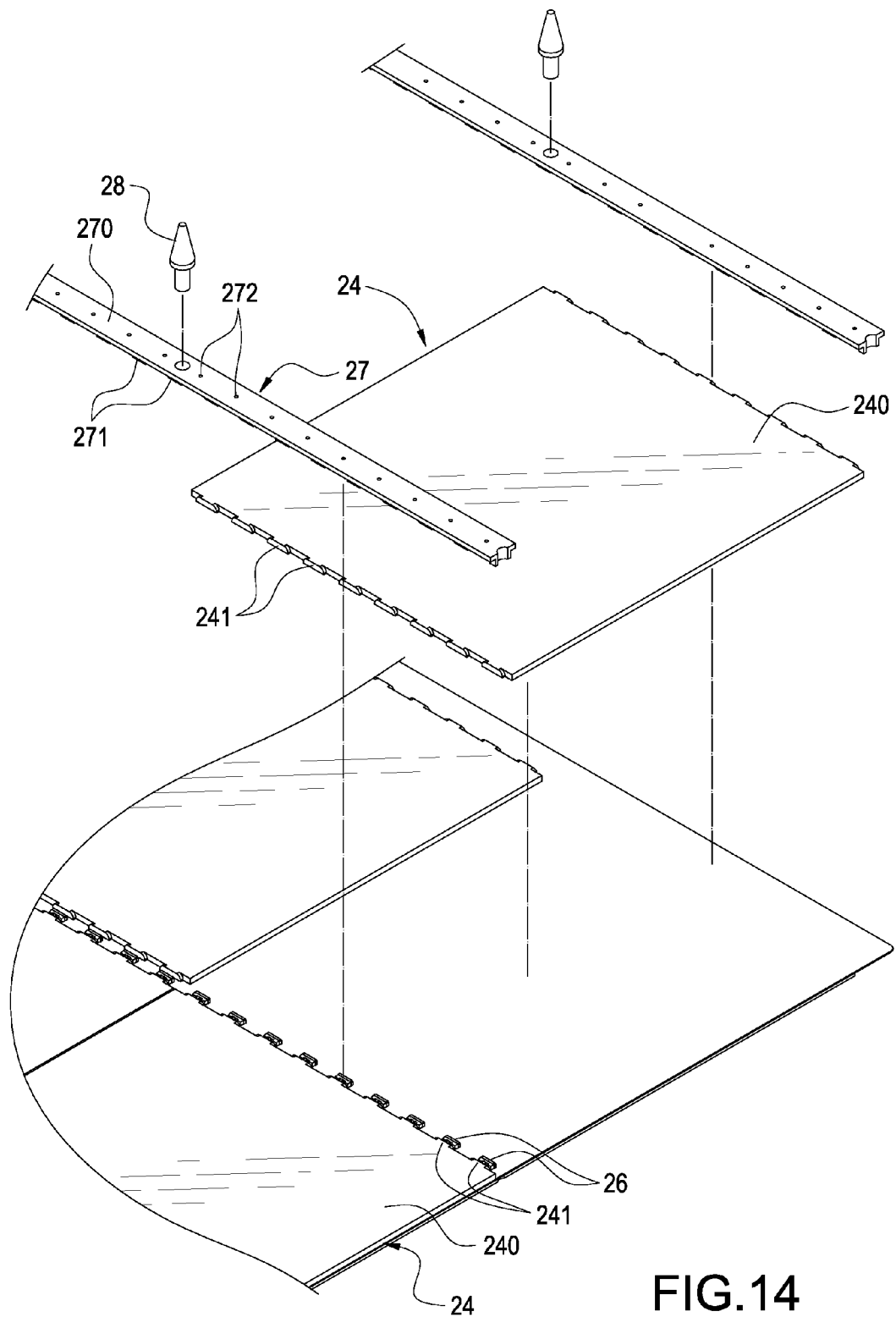
FIG. 14 is an explode perspective view of the backlight module.

Reference is made to FIG. 14, in order to increase the ratio of light emitted by the illuminant units 26 entering to the light guide plate 24 for reducing leakage of light and form a buffer area to prevent bright spot, each of the light guide plates 24 includes a main body 240 and a plurality of protruding parts 241 laterally protruded from the main body 240 and toward the illuminant units 26. The protruding parts 241 guide light to the main body 240, and preferably, the length of the protruding parts 241 protruded from a direction perpendicular the main body 240 is between 0.3 and 1 mm. Reference is made to FIG. 15, the illuminant units 26 are respectively arranged at the protruding parts 241. The protruding parts 241 is provided as a buffer area of light for receiving light emitted by the illuminant units 26 and diffusing light with higher light-emitting efficiency, thereby optical densities of light indirectly entering to the main body 240 through the protruding parts 241 and light obliquely directly emitted to the main body 240 by the illuminant units 26 are substantially the same, and any position of the main body 240 can receive uniform illumination. In addition, the pressing strip 27 is across the main bodies 240 of the light guide plates 24 and covers the protruding parts 241 arranged at two sides of the illuminant units 26 so as to correspondingly fasten the illuminant units 26 between two light guide plates 24, and the pressing strip 27 further covers the protruding parts 241 to prevent light leaked upwardly from the protruding parts 241.

With reference to FIG. 14 and FIG. 16, the pressing strip 27 includes a strip main body 270 and a plurality of stopping parts 271 extending downwardly from the strip main body 270, and the illuminant units 26 are staggered by the stopping part 271. Two sides of the stopping part 271 are respectively connected to the main bodies 240 of the light guide plates 24 to fasten the relative position of the light guide plates 24 and the illuminant units 26. The stopping part 271 prevents interference of light emitted by adjacent illuminant units 26, and in more particularly to that the adjacent illuminant units 26 with different colors and lighted at different times, therefore to increase picture quality. In addition, the pressing strip 27 has a plurality of through-holes 272 arranged above the illuminant units 26 and staggered by the stopping parts 271. By controlling the dimensions and disposed density of the through-holes 272, the light received by the optical films 29 can be optimal.

Reference is made to FIG. 17, which is a cross-sectional view of a backlight module according to yet embodiment of the present invention. The backlight module 200 is similar to that of embodiment mentioned above, but the different is that the pressing strip is a circuit board 30 such that the circuit board 30 arranged below the illuminant units 26 mentioned above is eliminated. The illuminant units 26 are disposed on the circuit board 30 and electrically connected thereto. However, its action and related description are the same as the pressing strip, and the detail thereof is not described here for brevity.

Reference is made to FIG. 18, which is a liquid crystal displaying apparatus according to a preferred embodiment of the present invention. The liquid crystal displaying apparatus 400 includes the backlight module 200 mentioned above and a liquid crystal panel 300 arranged on the backlight module 200. The backlight module 200 is used for providing a uniform planar light source to the liquid crystal panel 300.

To sum up, protruding parts 241 laterally protruded from the main body 240 guide light and uniform light at first, and then enter light into the main body 240 such that the main body 240 can receive light with uniform illumination. In addition, the pressing strip 27 arranged above the illuminant units 26 and respectively fastening the illuminant units 26 between two light guide plates 24, and light cannot directly project upwardly to the optical films 29 according to the pressing strip 27 or the circuit board 30 arranged above the illuminant units 26, thereby even though the illuminant units 26 are high power LEDs, the illumination of the area of the optical films 29 above the illuminant units 26 cannot higher than other area and achieve request of uniformity illumination. Furthermore, the light mixing space is largely decrease according to bright spot or bright line cannot appear on the optical films 29, and the distance disposed between the optical films 29 and the light guide plates 24 can decrease and then the thickness of the backlight module 200 can effectively decrease.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A backlight module comprising:
   a plurality of illuminant units;
   a pressing strip arranged above the illuminant units;
   two light guide plates respectively arranged at two opposite sides of the illuminant units, each light guide plate having a light-incident surface adjacent to the illuminant units and a light-emitting surface adjoined to the light-incident surface, a portion of the illuminant units emitting light toward the light-incident surface of one of the light guide plates, and the other portion of illuminant units emitting light toward the light-incident surface of the other light guide plate; and
   a circuit board disposed below the light guide plates and the illuminant units,
   wherein the dimensions of the light-emitting surface of each light guide plate is proportional to the amount of the illuminant units emitting light toward the light guide plate.

2. The backlight module in claim 1, wherein the two portions of the illuminant units emitting light toward the light guide plate are arranged in interlaced manner.

3. The backlight module in claim 1, wherein the pressing strip has a stopping part extended downwardly therefrom, the illuminant units are staggered by the stopping part and two sides of the stopping part are contacted with the light guide plates, respectively.

4. The backlight module in claim 1, wherein the pressing strip further comprises at least a through-via arranged above one of the illuminant units.

5. The backlight module in claim 1, wherein the pressing strip is made of transparent material or translucent material.

6. The backlight module in claim 1, wherein the light guide plate has at least a protruding part protruded from a main body of the light guide plate.

7. The backlight module in claim 6, wherein a length of the protruding part protruded from a direction perpendicular to the main body is between 0.3 and 1 mm.

8. A backlight module comprising:
a plurality of illuminant units; and
a light guide plate having two light guide unit respectively arranged at two opposite sides of the illuminant units and a connecting unit connected the light guide units, each light guide unit having a light-incident plate adjacent the illuminant units and a light-emitting surface adjoined to the light-incident surface, a portion of the illuminant units emitting light toward the light-incident surface of one of the light guide units, and the other portion of the illuminant units emitting light toward the light-incident surface of the other light guide unit,
wherein the dimensions of the light-emitting surface of each light guide unit is proportional to the amount of the illuminant units which emitting light toward the light guide unit, and
wherein the connecting unit is arranged below the illuminant units, the backlight module further comprises a circuit board of strip shape and arranged above the illuminant units, the illuminant units are electrically connected to the circuit board.

9. The backlight module in claim 8 wherein the two portions of the illuminant units emitting light toward the light guide units are arranged in interlaced manner.

10. A backlight module comprising:
a plurality of illuminant units; and
a light guide plate having two light guide unit respectively arranged at two opposite sides of the illuminant units and a connecting unit connected the light guide units, each light guide unit having a light-incident plate adjacent the illuminant units and a light-emitting surface adjoined to the light-incident surface, a portion of the illuminant units emitting light toward the light-incident surface of one of the light guide units, and the other portion of the illuminant units emitting light toward the light-incident surface of the other light guide unit,
wherein the dimensions of the light-emitting surface of each light guide unit is proportional to the amount of the illuminant units which emitting light toward the light guide unit
wherein the connecting unit is arranged above the illuminant units, the backlight module further comprises a circuit board arranged below the light guide units and the illuminant units, and the illuminant units are electrically connected to the circuit board.

11. The backlight module in claim 10, wherein the connecting unit has at least a through-via arranged above the one of the illuminant units.

12. The backlight module in claim 10, wherein the circuit board has at least a stopping part extended downwardly therefrom, the illuminant unit are staggered by the stopping unit, and two sides of the stopping part are contacted to the light guide units, respectively.

13. The backlight module in claim 10, wherein the light guide plate has at least a protruding part protruded from a main body of the light guide plate.

14. The backlight module in claim 13, wherein a length of the protruding part protruded from a direction perpendicular to the main body is between 0.3 and 1 mm.

* * * * *